(12) United States Patent
Visca et al.

(10) Patent No.: US 6,878,772 B2
(45) Date of Patent: Apr. 12, 2005

(54) FLUOROPOLYMER AQUEOUS DISPERSIONS

(75) Inventors: Mario Visca, Alessandria (IT); Alba Chittofrati, Novara (IT); Valeri Kapeliouchko, Alessandria (IT); Marco Malvasi, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 122 days.

(21) Appl. No.: 10/360,732

(22) Filed: Feb. 10, 2003

(65) Prior Publication Data

US 2003/0153674 A1 Aug. 14, 2003

(30) Foreign Application Priority Data

Feb. 12, 2002 (IT) ...................................... MI2002A0260

(51) Int. Cl.$^7$ ................................................. C08K 5/06
(52) U.S. Cl. ...................................... 524/757; 524/758
(58) Field of Search ................................. 524/757, 758

(56) References Cited

U.S. PATENT DOCUMENTS

| | | | |
|---|---|---|---|
| 2,242,218 A | 5/1941 | Auer | |
| 2,559,752 A | 7/1951 | Berry | |
| 3,271,341 A | 9/1966 | Garrison | |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,380,618 A | 4/1983 | Khan et al. | |
| 4,864,006 A | 9/1989 | Giannetti et al. | |
| 4,990,283 A | * 2/1991 | Visca et al. | .................... 516/30 |
| 5,763,552 A | 6/1998 | Feiring et al. | |
| 5,789,508 A | 8/1998 | Baker et al. | |

FOREIGN PATENT DOCUMENTS

| | | |
|---|---|---|
| EP | 0 148 482 | 12/1984 |
| EP | 0 239 123 | 3/1987 |
| EP | 0 969 027 | 6/1999 |
| WO | 97/08214 | 3/1997 |
| WO | WO 00/71590 A1 | 11/2000 |

OTHER PUBLICATIONS

European Search Report.

* cited by examiner

Primary Examiner—Matthew A. Thexton
(74) Attorney, Agent, or Firm—Arent Fox, PLLC

(57) ABSTRACT

Fluoropolymer aqueous dispersions having particles with average diameters from 150 to 400 nm, comprising bifunctional fluorinated surfactants having formula:

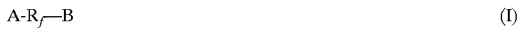

A-R$_f$—B     (I)

wherein:
  A and B, equal to or different from each other, are:
  —(O)$_p$CFX—COOM;
  M=NH$_4$, alkaline metal, H;
  X=F, CF$_3$;
  p is an integer equal to 0 or 1;
  R$_f$ is a linear or branched perfluoroalkyl chain, or a (per)fluoropolyether chain such that the number average molecular weight of (I) is in the range 300–1,800.

26 Claims, No Drawings

FLUOROPOLYMER AQUEOUS DISPERSIONS

The present invention relates to fluoropolymer aqueous dispersions having particles with an average diameter from 150 to 400 nm, preferably from 170 to 280 nm, having a reduced environmental impact, in particular a reduced toxicity expressed as acute toxicity (LD50 as defined below) and to the process for preparation thereof.

More specifically the invention relates to fluoropolymer dispersions, having a lower environmental impact as above defined, comprising bifunctional fluorinated surfactants having a number average molecular weight from 300 to 1,800, preferably from 500 to 1,600, more preferably from 600 to 1,200.

Still more specifically the present invention relates to tetrafluoroethylene (TFE) homopolymers or copolymers latexes (or dispersions) having a low environmental impact, having particles with an average diameter in the range 150–400 nm, preferably 170–280 nm, usable in the impregnation of textiles, allowing the obtaining of films with improved gloss and crack free.

It is known in the prior art that for the preparation of fluorinated polymers two different polymerization methods can be used. If the suspension polymerization is used, a reactor-bead formed by polymer granules of high sizes, of the order of millimeters, is obtained. Therefore with this process, dispersions having the above sizes are not obtained.

The other known process is the so called emulsion polymerization, through which a colloidal aqueous dispersion is obtained having particle sizes of the order of hundred nm.

It is also known that the fluoropolymer dispersions, and in particular of polytetrafluoroethylene, are largely used in the textile impregnation industry to give coatings having superior antiadherent properties, good chemical and atmospheric agents resistance and non flammability. Said dispersions can be used in particular for the coating of kitchen utensiles, chemical equipments and glass textiles. One of the main coating properties is the gloss which must be as high as possible. Indeed an improved gloss is an index of lower surface roughness which determines other coating properties as the antiadherence. It is well known that said property is a feature required to fluoropolymer coatings. Another essential coating requirement is their integrity, i.e. crack free.

It is well known that the TFE homopolymers and copolymers dispersions or latexes must give films having high mechanical properties, for example tensile stress resistance, etc. At this purpose it is known that in the emulsion polymerization of TFE homopolymers and copolymers it is required that the used surfactant does not act also as chain transfer agent, i.e. non telogenic surfactants must be used. See for example U.S. Pat. No. 2,559,752. For said reason the commercial PTFE dispersions are obtained by emulsion polymerization using as surfactants perfluorooctanoic acids (PFOH, for example n-PFOH, CAS-No. 335-67-1) in the form of ammonium and/or alkaline metal salts. The drawback to use said dispersions is that the PFOH can reach the environment, for example through the unavoidable plant washing effluents or under the aerosol form. PFOH and its salts are very effective and advantageous surfactants for their chemical inertia. However they are harmful and have been recently classified as dangerous for men and for the environment (see their LD 50 value).

To avoid the use of PFOH, polymerizations using other surfactants are known. In U.S. Pat. No. 5,763,552 the use of surfactants having the following formula for the TFE emulsion polymerization is described:

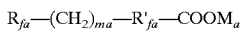

$$R_{fa}-(CH_2)_{ma}-R'_{fa}-COOM_a$$

wherein $M_a$ is $NH_4$, Li, Na, K o H; $R_{fa}$ and $R'_{fa}$ are perfluoroalkyl chains; ma is a number from 1 to 3. However no data are given on the toxicity or on the application properties of the obtained dispersions, in particular on the textile impregnation. Besides, the synthesis of said surfactants is complicated and therefore expensive. U.S. Pat. No. 4,380,618, U.S. Pat. No. 5,789,508 and patent application WO 97/08,214 describe the polymerization of TFE and tetrafluoroethylene copolymers using surfactants of formula:

$$F-(CF_2-CF_2)_{na}-CH_2-CH_2-SO_3M_a$$

with $M_a$ as above and na an integer as defined in said patents. The use of said surfactants shows the drawback not to allow to obtain PTFE having a high molecular weight. The dispersions obtained through this process have therefore a poor application interest for the insufficient mechanical properties of the coating.

U.S. Pat. No. 4,864,006 and EP 969,027 describe the use of surfactants having perfluoropolyether (PFPE) structure in the form of microemulsion comprising perfluoropolyether oil for the polymerization and copolymerization of fluorinated monomers. No data are given on the toxicity and on the application properties of the obtained dispersions, in particular on the textile impregnation.

Patent application WO 00/71,590 describes a polymerization process of fluorinated monomers by using a combination of at least two surfactants, one having a PFPE structure and the other having a perfluoroalkyl structure. The combined use of said surfactants allows to reach high reaction rates for example in the tetrafluoroethylene copolymerization with hexafluoropropene. However with said process polymer particles having sizes lower than 150 nm are obtained. Tests carried out by the Applicant (see comparative Examples) have shown that by operating according to the conditions indicated in said patent, dispersions having satisfactory application properties, e.g. film integrity, are not obtained, since the film is completely cracked. Furthermore the use of a surfactant combination results disadvantageous for the surfactant recovery process for their reuse.

In said patent application a combination of surfactants is used wherein the perfluoropolyether surfactant is present in a lower amount with respect to the other surfactant. In fact it is shown that the use of only the surfactant having a PFPE structure results inadequate. In fact the obtained latex is not stable and coagulum forms in the reactor (See comparative Example D of patent application).

In U.S. Pat. No. 3,271,341, for the TFE polymerization surfactants having a perfluoropolyether structure of type

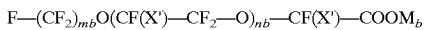

$$F-(CF_2)_{mb}O(CF(X')-CF_2-O)_{nb}-CF(X')-COOM_b$$

are used, wherein X' is F or $CF_3$; mb is comprised between 1 and 5; nb is comprised between 0 and 10; Mb is H, $NH_4$ or an alkaline metal or a substituted ammonium radical. No data are given on the toxicity and on the application properties of the obtained dispersions, in particular on the textile impregnation.

The need was felt to have availaable fluorinated polymer dispersions, in particular of PTFE or modified PTFE (as defined below), having a reduced environmental impact and such to be used in the textile impregnation with improved gloss.

Fluoropolymer latexes having a low environmental impact and suitable for the textile impregnation for the obtaining of films maintaining their physical integrity, crack free, and with improved gloss, have been unexpectedly and surprisingly found by the Applicant.

An object of the invention are aqueous fluoropolymer dispersions having particles with average diameters in the range 150–400 nm, preferably 170–280 nm, comprising bifunctional fluorinated surfactants having formula:

$$A-R_f-B \quad (I)$$

wherein A and B, equal to or different from each other, are:
—(O)$_p$CFX—COOM;
M=NH$_4$, alkaline metal, H;
X=F, CF$_3$;
p is an integer equal to 0 or 1;
R$_f$ is a linear or branched perfluoroalkyl chain, or a (per)fluoropolyether chain such that the number average molecular weight of the compound (I) is in the range 300–1,800, preferably 500–1,600, more preferably 600–1,200.

When the formula (I) compound does not derive from polymerization, with number average molecular weight it is meant the molecular weight of the compound. As said, R$_f$ is formed by a perfluorocarbon or (per)fluoropolyether chain containing a number of carbon atoms, and optionally oxygen, such to give the above molecular weight.

The invention dispertions contain an amount of formula (I) surfactant comprised between 0.01 and 3% by weight with respect to the fluoropolymer, preferably between 0.05 and 1% by weight.

Preferably in the formula (I) surfactant Rf, B and A have the following meanings:

R$_f$ represents a (per)fluoropolyether chain comprising repeating units selected from one or more of the following, statistically distributed along the chain:
a) —(C$_3$F$_6$O)—;
b) —(CF$_2$CF$_2$O)—;
c) —(CFL$_0$O)—, wherein L$_0$=—F, —CF$_3$;
d) —(CF$_2$(CF$_2$)$_{z'}$CF$_2$O)—, wherein z' is an integer 1 or 2;
e) —(CH$_2$CF$_2$CF$_2$O)—;
A=—(O)$_p$CFX—COOM with p=1;
B=—(O)$_p$CFX—COOM with p=0.

In particular R$_f$ preferably has one of the following structures:
1) —(CF$_2$O)$_a$—(CF$_2$CF$_2$O)$_b$—
    when both the units (CF$_2$O) and (CF$_2$CF$_2$O) are present, b/a is comprised between 0.3 and 10, extremes included, a being an integer different from 0; or one of the two units can be absent, preferably that having index a, a and b as defined below;
2) —(CF$_2$—(CF$_2$)$_{z'}$—CF$_2$O)$_b$—
    z' is an integer and is 1 or 2;
3) —(C$_3$F$_6$O)$_r$—(C$_2$F$_4$O)$_b$—(CFL$_0$O)$_t$—
when all the three units are present: r/b=0.5–2.0 (r+b)/t= 10–30, b and t being integers different from 0; or one or two of the three units can be absent, preferably that with index b; L$_0$ being as above; r, b, t as defined below;
4) —(OC$_3$F$_6$)$_r$—(CFL$_0$O)$_t$—OCF$_2$—R'$_f$—CF$_2$ O—(C$_3$F$_6$O)$_r$—(CFL$_0$O)$_t$—
    wherein:
    R'$_f$ is a fluoroalkylene group from 1 to 4 carbon atoms; L$_0$ as above; r as defined below;
5) —(CF$_2$CF$_2$CH$_2$O)$_{q'}$—R'$_f$—O—(CH$_2$CF$_2$CF$_2$O)$_{q'}$—
    wherein R$_{.f}$ as above; q' as defined below;
6) —(C$_3$F$_6$O)$_r$—OCF$_2$—R'$_f$—CF$_2$O—(C$_3$F$_6$O)$_r$— wherein R$_{.f}$ as above; r as defined below;
in said formulas:
—(C$_3$F$_6$O)— can represent units of formula: —(CF(CF$_3$)CF$_2$O)— and/or —(CF$_2$—CF(CF$_3$)O)—;
a, b, b', q', r, t, are integers, such that R$_f$ shows number average molecular weight values such as to give the molecular weight of the above formula (I) surfactant.

The preferred (per)fluoropolyether chain R$_f$ is the 1) having the structure: —(CF$_2$O)$_a$—(CF$_2$CF$_2$O)$_b$—, a and b are such that the molecular weight of the formula (I) surfactant is within the above limits.

The surfactants of general formula (I) wherein R$_f$ is a (per)fluoropolyether are obtainable by well known processes of the prior art, see for example the following patents herein incorporated by reference: U.S. Pat. Nos. 3,665,041, 2,242,218, 3,715,378, and European patent EP 239,123. The functionalized fluoropolyethers of formula (I) can be obtained for example according to patents EP 148,482, U.S. Pat. No. 3,810,874 by hydrolysis of the corresponding ester or by oxidation of the hydroxyl function.

The fluoropolymers of the invention dispertions are formed by:
tetrafluoroethylene (TFE) homopolymers and TFE copolymers with monomers having at least one unsaturation of ethylene type;
thermoprocessable fluoropolymers (from the melt) based on TFE as PFA, MFA, FEP and ETFE;
VDF-based homopolymers and copolymers;
homopolymers and copolymers based on CTFE, for example PCTFE and copolymer E/CTFE;
VDF-based fluoroelastomers:
    VDF/HFP, optionally containing TFE and/or vinylethers selected from perfluoroalkylvinylethers and/or perfluoroalkoxyalkylvinylethers; optionally containing hydrogenated olefins such ethylene and propylene;
(per)fluoroelastomers based on TFE:
    TFE copolymers with vinylethers selected from perfluoroalkylvinylethers and/or perfluoroalkoxyalkylvinylethers, in particular TFE/PMVE, TFE/PEVE, TFE/PPVE;
    TFE copolymers with hydrogenated olefins, preferably ethylene and/or propylene;
TFE and/or VDF amorphous and/or crystalline fluoropolymers containing dioxole rings having 5–7 carbon atoms, in particular those obtained by copolymerization with (per)fluorodioxoles or with dienic monomers which cyclizing give dioxole rings.

The tetrafluoroethylene (TFE) copolymers with monomers having at least one ethylene type unsaturation comprise comonomers both of hydrogenated and fluorinated type. The comonomer amount is preferably lower than 3% by weight, preferably lower than 1% to have non thermoprocessable copolymers (the so called modified PTFE).

Among the hydrogenated comonomers, ethylene, propylene, acrylic monomers, for example methylmethacrylate, (meth)acrylic acid, hydroxyethylenacrylate, styrene monomers, such as for example styrene, can be mentioned.

Among the fluorinated comonomers it can be mentioned:
C$_3$–C$_8$ perfluoroolefins, as hexafluoropropene (HFP);
C$_2$–C$_8$ hydrogenated fluoroolefins, as vinyl fluoride (VF), vinylidene fluoride (VDF), trifluoroethylene, CH$_2$=CH— R$_{f0}$ perfluoroalkylethylene, wherein R$_{f0}$ is a C$_1$–C$_6$ perfluoroalkyl;
chloro- and/or bromo- and/or iodo-C$_2$–C$_6$ fluoroolefins, as chlorotrifluoroethylene (CTFE);
CF$_2$=CFOR$_{f0}$ (per)fluoroalkylvinylethers (PAVE), wherein R$_{f0}$ is a C$_1$–C$_6$ (per)fluoroalkyl, for example CF$_3$, C$_2$F$_5$, C$_3$F$_7$;

$CF_2=CFOX_0$ (per)fluoro-oxyalkylvinylethers, wherein $X_0$ is a $C_1$–$C_{12}$ alkyl, or a $C_1$–$C_{12}$ oxyalkyl, or a $C_1$–$C_{12}$ (per)fluorooxyalkyl having one or more ether groups, for example perfluoro-2-propoxy-propyl;

fluorodioxoles, preferably perfluorodioxoles.

The invention dispertions can also contain mixtures of formula (I) surfactants.

The invention dispertions can optionally contain also other fluorinated surfactants, different from those of formula (I), for example in amounts from 0.0001 to 0.1% by weight on the fluoropolymer weight, and generally not higher than 20% by weight with respect to the total amount of the formula (I) surfactant. The presence of said surfactants, belonging to the classes commonly used in the polymerization of fluorinated polymers, does not compromise the environmental/toxicological impact of the dispersions, since these are used in small amounts.

In particular the optional surfactants which can be used are selected from the following:

$$T(C_3F_6O)_{n0}(CFXO)_{m0}CF_2COOM \qquad (II)$$

wherein:

T can be Cl or a perfluoroalkoxide group; $C_kF_{2k+1}O$ with k=integer from 1 to 3, optionally one F atom being substituted by a Cl atom;

n0 is an integer which can range from 1 to 6 and m0 is an integer from 0 to 6;

M and X as above;

$$CF_3(CF_2)_{n1}COOM \qquad (III)$$

wherein:

n1 is an integer which can range from 4 to 12;

M is as above;

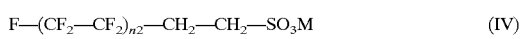

$$F-(CF_2-CF_2)_{n2}-CH_2-CH_2-SO_3M \qquad (IV)$$

wherein:

M is as above;

n2 is an integer ranging from 2 to 5.

As said, the dispersions of the fluoropolymers of the invention are characterized by a reduced environmental impact, in particular a reduced surfactant toxicity expressed as acute toxicity (LD 50 as defined below). Generally said dispersions can be used for coating of substrata, etc., or after coagulation they can be used for example as powder coating, or for the thermoprocessable polymers worked from the melt to obtain manufactured articles. More specifically the latexes (or dispersions) of TFE homopolymers or copolymers having a low environmental impact, with average particle diameter in the range 150–400 nm, preferably 170–280 nm, can be advantageously used in the textile impregnation.

A further object of the present invention is a process for the preparation of dispersions based on fluoropolymers as above defined comprising:

a) feeding of the solution of formula (I) bifunctional surfactant into the polymerization reactor, in such amount that the surfactant concentration is from 0.05 to 20 g per litre of reaction medium, preferably from 0.1 to 5 g per litre of reaction medium;

b) optionally the formula (I) surfactant added in phase a) can be partially substituted, as already said above, by a fluorinated surfactant different from the formula (I) surfactant in the above amounts, said optional surfactant preferably selected from those of formula (II)–(IV);

c) feeding of the reaction medium into the polymerization reactor, reactor degassing, addition in the reactor of one or more fluorinated monomers, optionally chain transfer agents, optionally stabilizers;

d) addition of the polymerization initiator, and optionally during the polymerization, of additional amounts of monomers and/or comonomers, initiators, transfer agents;

e) optionally, addition during the polymerization of additional amounts of formula (I) surfactant, so as to obtain a final concentration of total fluorinated surfactant (initial surfactant+surfactant added during the polymerization) from 0.01 to 3% by weight with respect to the fluoropolymer weight, preferably from 0.05 to 1% by weight; at least 80% by weight, more preferably at least 90% by weight, and still more preferably 100% by weight of the total amount of surfactant as above being formed by a formula (I) surfactant;

f) discharge from the reactor of the polymer latex.

The stabilizers, the chain transfer agents and the polymerization initiators are those commonly used in the polymerization of fluorinated monomers.

The discharged latex from the reactor can be subjected to the usual post-treatments known in the prior art in function of the uses. For example the discharged dispersion can be coagulated to obtain fine polymer powders. The latex concentration can also be mentioned, carried out for example by heating in the presence of non ionic surfactants or by ultrafiltration for applications in the surface coating and in the textile impregnation, for example glass, carbon or aramid fibers.

The dispersions obtained by the invention process, as such or after post-treatment, can also be used for the coating of surfaces of organic and/or inorganic polymers, of metals or ceramics, etc.

As said, the present invention process can be carried out also by substituting a part of the formula (I) bifunctional surfactant with the above optional surfactants, in the mentioned amounts, in particular of formula (II)–(IV), conventionally used for the fluoropolymer polymerization, such for example ammonium perfluoro-octanoate.

The present invention will be illustrated by the following Examples, which have a merely indicative and non limitative purpose.

EXAMPLES

The properties and parameters of interest related to the polymers described in the Examples are determined by the analysis and characterization methods described hereinafter:

Determination of the First Melting Temperature and of the Crystallization Heat

The determination of the first melting temperature and of the crystallization heat is carried out by the differential calorimetry technique, using a Perkin Elmer DSC 7 type calorimeter. About 10 mg of dried polymer are heated from 220° C. up to 370° C. at a rate of 10° C./min. The temperature corresponding to the maximum of the melting endothermy is indicated as polymer first melting temperature. After 15 minutes of stay at 370° C., the polymer is cooled to a temperature of 220° C. at the rate of 10° C./min. The area subtended from the crystallization exothermy is integrated and its value, expressed in cal/g, is indicated as crystallization heat.

Determination of the Average Particle Diameter

The average particle diameter is measured by an instrument based on the laser light diffusion, in particular on the Photon Correlation Spectroscopy, equipped with Brookhaven 2030 AT model correlator and Argon Laser light source having a wave-length of 514.5 mm by Spectra-Physics. The latex samples to be subjected to measurement are suitably diluted with water filtered at 0.2 μm on Millipore filter. The scattering measurement is carried out at room temperature at an angle of 90°.

Determination of the Dispersion Polymer Content

The polymer content of the latex discharged from the reactor is evaluated by drying at 105° C. for 1 hour about 2 g of latex. The dry product content of the latex is obtained by the formula:

Dry product %=100×(weight after drying/latex initial weight)

Impregnation

Impregnation is carried out on vertical tower. The glass cloth is totally immersed in a bath containing the concentrated dispersion at a dragging rate equal to 1.2 m/min. The dispersion excess is removed by the cloth passage between two pressing rolls. Subsequently the impregnated cloth is dried at 120° C. and sintered at 350° C. for a time of about 30 seconds. The impregnation and the subsequent sintering process is repeated 6 times to have a deposition of about 150 grams of PTFE for m² of cloth.

Acute Toxicity LD 50 by os

The acute toxicity (LD 50) by os. has been determined according to the OECD N°401 directions of 24.02.1987.

The LD 50 is defined as the dose of the tested substance which administered in a single dose to a group of animals, for example rats, causes a 50% mortality in the treated animals.

Gloss

The film gloss has been determined according to the ASTM D 523 method.

Example 1

Obtaining of a PTFE Dispersion Using a Formula (I) Surfactant Having Number Average Molecular Weight 750 and Impregnation of a Glass Cloth 110 ml of an aqueous solution having a 100 g/litre concentration of the following formula (I) surfactant

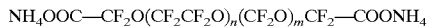

wherein the average value of the n/m ratio is equal to 2 and average molecular weight equal to 750 (ZDIAC 750), are added to 31 litres of suitably degassed water in a 50 litre autoclave, equipped with a mechanical stirrer and previously put under vacuum. In the reactor also 300 grams of paraffin with softening point comprised between 52° C. and 54° C. were previously introduced. The autoclave is kept under mechanical stirring and is pressurized with TFE up to a pressure of 20 bar. The internal temperature is brought to 68° C. At this point 500 cc of $(NH_4)_2S_2O_8$ (APS) and disuccinic peroxide (DSAP) solution, corresponding to 192 mg of APS and 3,840 mg of DSAP are fed into the autoclave.

When the pressure in the reactor has decreased of 0.5 bar, one begins to feed TFE by means of a compressor so as to maintain a constant pressure of 20 bar inside the reactor. In the meantime the reactor internal temperature is increased up to 79° C. at a rate of 0.4° C./min. During the reaction 510 ml of the aqueous solution at 100 grams/litre of ZDIAC 750 are fed into the autoclave. After 60 minutes, when 15,800 grams of TFE have reacted, the TFE feeding is stopped, the reactor evacuated and cooled. After the latex discharge the reactor internal surfaces result clean and free from coagulum.

The polymer primary particle diameter measured by Laser Light Scattering (LLS) results 249 nm. The polymer content in the latex is 32.1% by weight with respect to the wet dispersion.

The first melting temperature is 342.48° C., and the crystallization heat is −32,09 J/g determined by DSC.

To 10 kg of said dispersion, put in a thermostatic Pyrex glass reactor, 2 kg of a solution at 25% by weight of Triton X-100 are added. The mixture, initially at room temperature, is suitably homogenized and the temperature increased up to 71° C. At said temperature stirring is stopped and the separation of an upper limpid aqueous phase and of a lower phase having a high content in fluorinated polymer particles is noticed. The composition of said lower phase is equal to 72.1% by weight of fluorinated polymer and to 2.1% by weight of Triton X-100.

To 2,000 g of concentrated dispersion 0.42% by weight with respect to the ZDIAC 750 polymer, and subsequently Triton X-100, water and ammonia are added in such amounts that the final dispersion contains 60% by weight of PTFE and 3.5% of Triton X-100 with respect to the dispersion weight, and it has a pH of about 9. Said sample is used for the impregnation of a glass cloth using 6 successive steps. The final manufactured article, which does not show defects for example in the form of gels (microcoagula) or cissings, is characterized by a deposited PTFE amount equal to 156 g/m² of virgin cloth and by a gloss of 27.5%.

Example 2

Obtaining of a PTFE Dispersion Using a Formula (I) Surfactant Having Number Average Molecular Weight 1,200

220 ml of an aqueous solution having a 50 g/litre concentration of the surfactant of Example 1 but having an average molecular weight equal to 1,200 (ZDIAC 1200), m/n ratio=2 and having toxicity LD 50 determined by the above method higher than 2,000 mg/kg, are added to 31 litres of suitably degassed water in a 50 litre autoclave, equipped with a mechanical stirrer and previously put under vacuum. In the reactor also 300 grams of paraffin with softening point comprised between 52° C. and 54° C. were previously introduced. 500 ml of $(NH_4)_2S_2O_8$ (APS) solution corresponding to 520 mg of APS are fed into the autoclave. The autoclave is kept under mechanical stirring and is pressurized with TFE up to a pressure of 20 bar at a temperature of 55° C. At this point 500 ml of a $(NH_4)_2Fe(SO_4)_2 \cdot 6H_2O$ (SdM) solution corresponding to 90 mg of SdM are fed to the autoclave.

When the pressure in the reactor has decreased of 0.5 bar, one begins to feed TFE by means of a compressor so as to maintain a constant pressure of 20 bar inside the reactor. In the meantime the reactor internal temperature is increased up to 75° C. at a rate of 0.6° C./min. During the reaction 1,020 ml of the aqueous solution at 50 grams/litre of ZDIAC 1200 are fed into the autoclave. After 134 minutes, when 15,800 grams of TFE have reacted, the TFE feeding is stopped, the reactor evacuated and cooled. After the latex discharge the reactor internal surfaces result clean and free from coagulum.

The polymer primary particle diameter measured by Laser Light Scattering (LLS) results 170 nm. The polymer content in the latex is 28.5% by weight with respect to the wet dispersion.

The first melting temperature is 341.66° C., and the crystallization heat is −31.25 J/g determined by DSC.

To 10 kg of said dispersion, put in a thermostatic Pyrex glass reactor, 2 kg of a solution at 25% by weight of Triton X-100 are added. The mixture, initially at room temperature, is suitably homogenized and the temperature increased up to 68.5° C. At said temperature stirring is stopped and the separation of an upper clear aqueous phase and of a lower phase having a high content in fluorinated polymer particles is noticed. The composition of said lower phase is equal to 65.3% by weight of fluorinated polymer and to 2.7% by weight of Triton X-100.

Example C1 (Comparative)
Experiment of Emulsion Polymerization Using a Formula (I) Surfactant Having Number Average Molecular Weight 4,000

62 grams of the surfactant of Example 1 but having a number average molecular weight equal to 4,000 (ZDIAC 4000) are added to 31 litres of suitably degassed water in a 50 litre autoclave, equipped with a mechanical stirrer and previously put under vacuum. In the reactor also 300 grams of paraffin with softening point comprised between 52° C. and 54° C. were previously introduced. The autoclave is kept under mechanical stirring and is pressurized with TFE up to a pressure of 20 bar. The internal temperature is brought to 68° C. At this point 500 ml of a $(NH_4)_2S_2O_8$ (APS) and disuccinic peroxide (DSAP) solution corresponding to 192 mg of APS and 3,840 mg of DSAP are fed into the autoclave.

When the pressure in the reactor has decreased of 0.5 bar, one begins to feed TFE by means of a compressor so as to maintain a constant pressure of 20 bar inside the reactor. In the meantime the reactor internal temperature is increased up to 79° C. at a rate of 0.4° C./min. After 38 minutes, when 4,025 grams of TFE have reacted, the reaction is stopped due to the anomalous kinetic which indicates the coagulum formation. The TFE feeding is stopped, the reactor evacuated and cooled. After the opening, inside the reactor a complete latex coagulation is noticed.

Example C2 (Comparative)
Preparation of an Aqueous Dispersion Using as Surfactant the Ammonium Perfluorooctanoate and Impregnation of a Glass Cloth with Said Dispersion 110 ml of an aqueous solution having a 100 g/litre concentration of ammonium perfluorooctanoate (PFOA) are added to 31 litres of suitably degassed water in a 50 litre autoclave, equipped with a mechanical stirrer and previously put under vacuum. In the reactor also 300 grams of paraffin with softening point comprised between 52° C. and 54° C. were previously introduced. 500 ml of a $(NH_4)_2S_2O_8$ (APS) solution corresponding to 520 mg of APS are fed into the autoclave. The autoclave is kept under mechanical stirring and is pressurized with TFE up to a pressure of 20 bar at a temperature of 55° C. At this point 500 ml of a $(NH_4)_2Fe(SO_4)_2 \cdot 6H_2O$ (SdM) solution corresponding to 90 mg of SdM are fed into the autoclave.

When the pressure in the reactor has decreased of 0.5 bar, one begins to feed TFE by means of a compressor so as to maintain a constant pressure of 20 bar inside the reactor. In the meantime the reactor internal temperature is increased up to 75° C. at a rate of 0.6° C./min.

During the reaction 510 ml of an aqueous solution of ammonium perfluorooctanoate having the above concentration are introduced into the autoclave. After 89 minutes, when 15,800 grams of TFE have reacted, the TFE feeding is stopped, the reactor evacuated and cooled. After the latex discharge, the reactor internal surfaces result clean and free from coagulum.

The polymer primary particle diameter measured by Laser Light Scattering (LLS) results equal to 213 nm.

The polymer content in the latex is equal to 33.3% by weight with respect to the wet dispersion.

To 10 kg of said dispersion, put in a thermostatic Pyrex glass reactor, 2 kg of a solution at 25% by weight of Triton X-100 are added. The mixture, initially at room temperature, is suitably homogenized and the temperature increased up to 68.2° C. At said temperature stirring is stopped and the separation of an upper limpid aqueous phase and of a lower phase having a high content in fluorinated polymer particles is noticed. The composition of said lower phase is equal to 70.6% by weight of fluorinated polymer and to 2.2% by weight of Triton X-100.

To 2,000 g of concentrated dispersion 0.42% by weight of PFOA with respect to the polymer, and subsequently Triton X-100, water and ammonia are added in such amounts that the final dispersion contains 60% by weight of PTFE and 3.5% of Triton X-100 with respect to the dispersion weight, and it has a pH of about 9. Said sample is used for the impregnation of a glass cloth according to the above process. The final manufactured article, which does not show defects for example in the form of gels (microcoagula) or cissings, is characterized by a deposited PTFE amount equal to 152 g/m² of virgin cloth and by a gloss of 22.5%.

Example C3 (Comparative)
Experiment of Emulsion Polymerization Using at the Start a Formula (I) Surfactant Having an Average Molecular Weight of 750 and During the Reaction a Formula (I) Surfactant Having an Average Molecular Weight of 2,000

110 ml of an aqueous solutionn having a 100 g/l concentration of the surfactant of Example 1 are added to 31 litres of suitably degassed water in a 50 litre autoclave, equipped with a mechanical stirrer and previously put under vacuum. In the reactor also 300 grams of paraffin with softening point comprised between 52° C. and 54° C. were previously introduced. The autoclave is kept under mechanical stirring and is pressurized with TFE up to a pressure of 20 bar. The internal temperature is brought to 68° C. At this point 500 ml of a $(NH_4)_2S_2O_8$ (APS) and disuccinic peroxide (DSAP) solution corresponding to 192 mg of APS and 3,840 mg of DSAP are fed into the autoclave.

When the pressure in the reactor has decreased of 0.5 bar, one begins to feed TFE by means of a compressor so as to maintain a constant pressure of 20 bar inside the reactor. In the meantime the reactor internal temperature is increased up to 79° C. at a rate equal to 0.4° C./min. During the reaction 1,700 ml of the aqueous solution at 30 g/litre of the surfactant of Example 1 but having an average molecular weight equal to 2,000 (ZDIAC 2000), produced and sold by Ausimont S.p.A. under the commercial name Fluorolink® C, are fed into the autoclave. After 157 minutes, when 15,800 grams of TFE have reacted, the TFE feeding is stopped, the reactor evacuated and cooled. After the latex discharge, the reactor internal surfaces result very dirty and 3 kg of coagulum are recovered.

The polymer primary particle diameter measured by Laser Light Scattering (LLS) results equal to 216 nm.

Example C4 (Comparative)
Experiment of Emulsion Polymerization Using at the Start a Formula (I) Surfactant Having an Average Molecular Weight of 750 and During the Reaction an Amount Higher than that Used in Example C3 of a Formula (I) Surfactant Having an Average Molecular Weight of 2,000

110 ml of an aqueous solution of the surfactant of Example 1 are added to 31 litres of suitably degassed water in a 50 litre autoclave, equipped with a mechanical stirrer and previously put under vacuum. Into the reactor also 300 grams of paraffin with softening point comprised between 52° C. and 54° C. were previously introduced. The autoclave is kept under mechanical stirring and is pressurized with TFE up to a pressure of 20 bar. The internal temperature is brought to 68° C. At this point 500 ml of a $(NH_4)_2S_2O_8$ (APS) and disuccinic peroxide (DSAP) solution corresponding to 192 mg of APS and 3,840 mg of DSAP are fed into the autoclave.

When the pressure in the reactor has decreased of 0.5 bar, one begins to feed TFE by means of a compressor so as to maintain a constant pressure of 20 bar inside the reactor. In the meantime the internal temperature of the reactor is increased up to 79° C. at a rate equal to 0.4° C./min. During the reaction 3,730 ml of the aqueous solution at 30 g/litre of the surfactant of Example 1 but having an average molecular weight equal to 2,000 (ZDIAC 2000), produced and sold by Ausimont S.p.A. under the commercial name Fluorolink® C., are fed into the autoclave. After 170 minutes, the TFE feeding is stopped, when 15,300 grams of TFE have reacted, the reactor evacuated and cooled. After the latex discharge, the reactor internal surfaces result very dirty and 6 kg of coagulum are recovered.

The polymer primary particle diameter measured by Laser Light Scattering (LLS) results equal to 202 nm.

Example C5 (Comparative)
Experiment of Polymerization Using a Formula (II) Surfactant Having an Average Molecular Weight of 650

320 ml of an aqueous solution at 50 g/litre of an ammonium salt of the formula (II) surfactant having an average molecular weight equal to 650 (Galden® 650) are added to 31 litres of suitably degassed water in a 50 litre autoclave, equipped with a mechanical stirrer and previously put under vacuum. In the reactor also 300 grams of paraffin with softening point comprised between 52° C. and 54° C. were previously introduced. 500 ml of a $(NH_4)_2S_2O_8$ (APS) solution corresponding to 520 mg of APS are fed into the autoclave. The autoclave is kept under mechanical stirring and is pressurized with TFE up to a pressure of 20 bar at a temperature of 55° C. At this point 500 ml of a solution of $(NH_4)_2Fe(SO_4)_2 6H_2O$ (SdM) corresponding to 70 mg of SdM are fed into the autoclave.

When the pressure in the reactor has decreased of 0.5 bar, one begins to feed TFE by means of a compressor so as to maintain a constant pressure of 20 bar inside the reactor. In the meantime the reactor internal temperature is increased up to 75° C. at a rate of 0.6° C./min. During the reaction 920 ml of the above aqueous solution of Galden® 650 are fed into the autoclave. After 102 minutes, the TFE feeding is stopped, when 10,100 grams of TFE have reacted, the reactor evacuated and cooled. After the latex discharge, the reactor internal surfaces result very dirty and 5 kg of coagulum are recovered.

The polymer primary particle diameter measured by Laser Light Scattering (LLS) results of 280 nm.

Example C6 (Comparative)
Obtaining of a PTFE Dispersion Using a Mixture Formed by a Formula (I) Surfactant Having a Number Average Molecular Weight of 2,000 and a Formula (IV) Surfactant in a 1:10 Ratio by Weight and Subsequent Cloth Impregnation 2,000 ml of an aqueous solution contaianing 8 grams of the surfactant of Example 1 but having an average molecular weight equal to 2,000 (ZDIAC 2000) and 80 grams of formula (IV) surfactant wherein n2=3 and M=H (product sold by ATOFINA with the trademark Forafac® 1033D), are added to 29 litres of suitably degassed water in a 50 litre autoclave, equipped with a mechanical stirrer and previously put under vacuum. In the reactor also 300 grams of paraffin with softening point comprised between 52° C. and 54° C. were previously introduced. The autoclave is kept under mechanical stirring and is pressurized with TFE up to a pressure of 20 bar. The internal temperature is brought to 68° C. At this point 500 ml of a $(NH_4)_2S_2O_8$ (APS) and disuccinic peroxide (DSAP) solution corresponding to 384 mg of APS and 7,680 mg of DSAP are fed into the autoclave.

When the pressure in the reactor has decreased of 0.5 bar, one begins to feed TFE by means of a compressor so as to maintain a constant pressure of 20 bar inside the reactor. In the meantime the reactor internal temperature is increased up to 79° C. at a rate of 0.4° C./min. After 73 minutes, when 15,800 grams of TFE have reacted, the TFE feeding is stopped and the reactor evacuated and cooled. After the latex discharge, the reactor internal surfaces result clean and free from coagulum.

The polymer primary particle diameter measured by Laser Light Scattering (LLS) results of 136 nm. The polymer content in the latex is equal to 34.4% by weight with respect to the wet dispersion.

To 10 kg of said dispersion, transferred in a thermostatic Pyrex glass reactor, 2 kg of a solution at 25% by weight of Triton X-100 are added. The mixture, initially at room temperature, is suitably homogenized and the temperature increased up to 66.5° C. At said temperaature stirring is stopped and the separation of an upper limpid aqueous phase and of a lower phase having a high content in fluorinated polymer particles is noticed. The composition of said lower phase is equal to 60.7% by weight of fluorinated polymer and to 3.4% by weight of Triton X-100.

To 2,000 g of concentrated dispersion 0.42% by weight with respect to the polymer of a mixture ZDIAC 2000+ Forafac 1033D in a 1:10 ratio, and subsequently TRITON X-100, water and ammonia are added in such amounts that the final dispersion contains 60% by weight of PTFE and 3.5% of TRITON X-100 with respect to the dispersion weight, and it has a pH of about 9.

Said sample is used for the impregnation of a glass cloth by 6 successive steps.

The final manufactured article shows several defects in the form of gels or cissings and is completely cracked, it is characterized by a deposited PTFE amount of 155 g/m² of virgin cloth and by a gloss of 28.5%.

What is claimed is:
1. Aqueous dispersions of fluoropolymers having particles with average diameters in the range 150–400 nm comprising bifunctional fluorinated surfactants having formula

$$A-R_f-B \qquad (I)$$

wherein:
A and B, equal to or different from each other, are:
—$(O)_p$CFX—COOM
wherein:
M=$NH_4$, alkaline metal, H;
X=F, $CF_3$;
p is an integer equal to 0 or 1;
$R_f$ is a linear or branched perfluoroalkyl chain, or a (per)fluoropolyether chain such that the number average molecular weight of (I) is in the range 300–1,800.
2. Dispersions according to claim 1, containing an amount of formula (I) surfactant comprised between 0.01 and 3% by weight with respect to the fluoropolymer.
3. Dispersions according to claim 1, wherein in the formula (I) surfactant $R_f$, A and B have the following meanings:
$R_f$ represents a (per)fluoropolyether chain comprising repeating units selected from one or more of the following, statistically distributed along the chain:
a) —$(C_3F_6O)$—;
b) —$(CF_2CF_2O)$—;
c) —$(CFL_0O)$—, wherein $L_0$=—F, —$CF_3$;
d) —$(CF_2(CF_2)_{z'}CF_2O)$—, wherein z' is an integer 1 or 2;

e) —(CH$_2$CF$_2$CF$_2$O)—;
A=—(O)$_p$CFX—COOM with p=1;
B=—(O)$_p$CFX—COOM with p=0.

4. Dispersions according to claim 3, wherein the structure of R$_f$ is selected from the following:
1) —(CF$_2$O)$_a$—(CF$_2$CF$_2$O)$_b$—
    when both the units (CF$_2$O) and (CF$_2$CF$_2$O) are present, b/a is comprised between 0.3 and 10, extremes included, a being an integer different from 0; or one of the two units can be absent;
2) —(CF$_2$—(CF$_2$)$_{z'}$—CF$_2$O)$_{b'}$—
    wherein z' is an integer equal to 1 or 2;
3) —(C$_3$F$_6$O)$_r$—(C$_2$F$_4$O)$_b$—(CFL$_0$O)$_t$—
    when all the three units are present: r/b=0.5–2.0 (r+b)/t=10–30, b and t being integers different from 0; or one or two of the three units can be absent; L$_0$ as above; r, b, t as defined below;
4) —(OC$_3$F$_6$)$_r$—(CFL$_0$O)$_t$—OCF$_2$—R'$_f$—CF$_2$O—(C$_3$F$_6$O)$_r$—(CFL$_0$O)$_t$—;
5) —(CF$_2$CF$_2$CH$_2$O)$_{q'}$—R'$_f$—O—(CH$_2$CF$_2$CF$_2$O)$_{q'}$—
    wherein:
    R'$_f$ is a fluoroalkylene group from 1 to 4 carbon atoms; L$_0$ is as above; r and q' as defined below;
6) —(C$_3$F$_6$O)$_r$—OCF$_2$—R'$_f$—CF$_2$O—(C$_3$F$_6$O)$_r$—
    in said formulas:
    —(C$_3$F$_6$O)— is selected from —(CF(CF$_3$)CF$_2$O)—, —(CF$_2$—CF(CF$_3$3)O)—;
    a, b, b', q', r, t, are integers, such that the molecular weight of the formula (I) surfactant is within the above limits.

5. Dispersions according to claim 4, wherein the (per)fluoropolyether chain R$_r$ is 1) having the structure:
—(CF$_2$O)$_a$—(CF$_2$CF$_2$O)$_b$—.

6. Dispersions according to claim 1, wherein the fluoropolymers are formed by:
tetrafluoroethylene (TFE) homopolymers and its copolymers with monomers having at least one unsaturation of ethylene type;
thermoprocessable fluoropolymers from the melt based on TFE as PFA, MFA, FEP and ETFE;
VDF-based homopolymers and copolymers
CTFE-based homopolymers and copolymers;
VDF-based fluoroelastomers
VDF/HFP, optionally containing TEE and/or vinylethers selected from perfluoroalkylvinylethers and/or perfluoroalkoxyalkylvinylethers;
optionally containing hydrogenated olefins as ethylene and propylene;
(per)fluoroelastomers based on TFE:
TFE copolymers with vinylethers selected from perfluoroalkylvinylethers and/or perfluoroalkoxyalkylvinylethers, TFE/PMVE, TFE/PEVE, and TFE/PPVE;
TFE copolymers with hydrogenated olefins, ethylene and/or propylene;
amorphous and/or crystalline fluoropolymers of TFE and/or VDF containing dioxole rings having 5–7 carbon atoms, in particular obtained by copolymerization with (per)fluorodioxoles or with monomers which by cyclizing give dioxole rings.

7. Dispersions according to claim 6, wherein the copolymers of tetrafluoroethylene (TFE) with monomers having at least one unsaturation of ethylene type comprise comonomers both of hydrogenated and fluorinated type.

8. Dispersions according to claim 7, wherein the copolymers are not thermoprocessable and the comonomer amount is lower than 3% by weight.

9. Dispersions according to claim 7, wherein the hydrogenated comonomers of TFE copolymers are selected from ethylene, propylene, acrylic monomers, methylmethacrylate, (meth)acrylic acid, hydroxyethylenacrylate, styrene monomers, and styrene.

10. Dispersions according to claim 7, wherein the fluorinated comonomers of the TFE copolymers are selected from the following:
C$_3$–C$_8$ perfluoroolefins, as hexafluoropropene (HFP);
C$_2$–C$_5$ hydrogenated fluoroolefins, as vinyl fluoride (VF), vinylidene fluoride (VDF), trifluoroethylene, CH$_2$=CH—R$_{f0}$ perfluoroalkylethylene, wherein R$_{f0}$ is a C$_2$–C$_6$ perfluoroalkyl;
chloro- and/or bromo- and/or iodo- C$_2$–C$_6$ fluoroolefins, as chlorotrifluoroethylene (CTFE);
CF$_2$=CFOR$_{f0}$ (per) fluoroalkylvinylethers (PAVE), wherein R$_{f0}$ is a C$_1$–C$_6$ (per)fluoroalkyl or CF$_3$, C$_2$F$_5$, or C$_3$F$_7$;
CF$_2$=CFOX$_0$ (per)fluoro-oxyalkylvinylethers, wherein X$_0$ is a C$_1$–C$_{12}$ alkyl, or a C$_1$–C$_{12}$ oxyalkyl, or a C$_1$C$_{12}$ (per) fluorooxyalkyl having one or more ether groups or perfluoro-2-propoxy-propyl;
fluorodioxole, or perfluorodioxoles.

11. Dispersions according to claim 1, containing mixtures of surfactants of formula (I).

12. Dispersions according to claim 1, containing other fluorinated sufactants, different from those of formula (I), in amounts from 0.0001 to 0.1% by weight on the fluoropolymer weight, and not higher than 20% by weight with respect to the total amount of the formula (I) surfactant.

13. Dispersions according to claim 12, wherein the surfactants different from those of formula (I) which can be used are selected from the following:

$$T(C_3F_6O)_{n0}(CFXO)_{m0}CF_2COOM \quad (II)$$

wherein:
T=Cl or a perfluoroalkoxide group C$_k$F$_{2k+1}$O with k=integer from 1 to 3,
n0 is an integer from 1 to 6 and m0 is an integer from 0 to 6;
M and X as above;

$$CF_3(CF_2)_{n1}COOM \quad (III)$$

wherein:
n1 is an integer from 4 to 12;
M is as above;

$$F—(CF_2—CF_2)_{n2}—CH_2—CH_2—SO_3M \quad (IV)$$

wherein:
M is as above;
n2 is an integer from 2 to 5.

14. A process for the preparation of dispersions based on fluoropolymers according to claim 1, comprising:
a) feeding a solution of formula (I) bifunctional surfactant of claim 1 into a polymerization reactor, the surfactant concentration in the reactor being from 0.05 to 20 g per litre of reaction medium;
b) optionally the added formula (I) surfactant is partially substituted by a fluorinated surfactant different from that of formula (I), said optional surfactant selected from those of formula (II)

wherein:
T=Cl or a perfluoroalkoxide group $C_kF_{2k+1}O$ with k=integer from 1 to 3,
n0 is an integer from 1 to 6 and m0 is an integer from 0 to 6;
M and X as above;
or (IV)

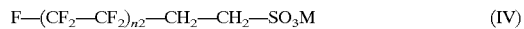

wherein:
M is as above;
n2 is an integer from 2 to 5;
c) feeding a reaction medium into the polymerization reactor, reactor degassing, addition in the reactor of one or more fluorinated monomers, optionally chain transfer agents and stabilizers;
d) addition of a polymerization initiator, and optionally during polymerization, of additional amounts of monomers and/or comonomers, initiators, transfer agents;
e) optionally, addition of additional amounts of formula (I) surfactant during the polymerization, having a final concentration of total fluorinated surfactant from 0.01 to 3% by weight with respect to the fluoropolymer; at least 80% by weight of the total surfactant amount being formed by a formula (I) compound;
f) discharge from the reactor of polymer latex.

15. A method to coat surfaces of organic and/or inorganic polymers, of metals or ceramics, comprising applying the dispersions according to claim 1.

16. A method to impregnate textiles, glass, carbon or aramid fibers, comprising applying the dispersions according to claim 15.

17. Manufactured articles obtained by treating surfaces of organic/inorganic polymers, metals or ceramics with the dispersions of claim 1.

18. Dispersions according to claim 8, wherein the comonomer amount is lower than 1% by weight.

19. Aqueous dispersions of fluoropolymers of claim 1 having particles with average diameters in the range 170–280 nm.

20. Aqueous dispersions of claim 1, wherein $R_f$ is a linear or branched perfluoroalkyl chain, or a (per)fluoropolyether chain such that the number average molecular weight of (I) is in the range 500–1,600.

21. Aqueous dispersions of claim 1, wherein $R_f$ is a linear or branched perfluoroalkyl chain, or a (per)fluoropolyether chain such that the number average molecular weight of (I) is in the range 600–1,200.

22. Dispersions according to claim 2, containing an amount of formula (I) surfactant comprised between 0.05 and 1% by weight with respect to the fluoropolymer.

23. The process for the preparation of dispersions of claim 14, wherein the surfactant concentration in the reactor is from 0.1 to 5 g per litre of reaction medium.

24. The process for the preparation of dispersions of claim 14, wherein a final concentration of total fluorinated surfactant is from 0.05 to 1% by weight with respect to the fluoropolymer.

25. The process for the preparation of dispersions of claim 14, wherein at least 90% by weight of the total surfactant amount being is formed by a formula (I) compound.

26. The process for the preparation of dispersions of claim 14, wherein 100% by weight of the total surfactant amount being is formed by a formula (I) compound.

* * * * *